United States Patent [19]

Ohbayashi

[11] Patent Number: 5,139,672

[45] Date of Patent: Aug. 18, 1992

[54] LIQUID FILTERING VESSEL

[75] Inventor: Masaaki Ohbayashi, Sakai, Japan

[73] Assignee: Ohbayashi Iron Works Co., Ltd., Osaka, Japan

[21] Appl. No.: 528,987

[22] Filed: May 25, 1990

[30] Foreign Application Priority Data

May 26, 1989 [JP] Japan ................................. 1-134424

[51] Int. Cl.⁵ ................................................ B01D 29/11
[52] U.S. Cl. ......................................... 210/452; 210/453;
210/455; 210/497.01
[58] Field of Search ............... 210/448, 452, 455, 453,
210/497.01

[56] References Cited

U.S. PATENT DOCUMENTS

| | | |
|---|---|---|
| 3,640,392 | 2/1972 | Smith et al. |
| 3,771,664 | 11/1973 | Schrink et al. ................... 210/448 |
| 3,814,261 | 6/1974 | Morgan, Jr. |
| 4,283,281 | 8/1981 | Cogan. |
| 4,539,116 | 9/1985 | Morin ................................ 210/445 |
| 4,948,504 | 8/1990 | Kierdorf et al. ................... 210/445 |

Primary Examiner—Robert A. Dawson
Assistant Examiner—W. L. Millard
Attorney, Agent, or Firm—Armstrong, Nikaido Marmelstein, Kubovcik & Murray

[57] ABSTRACT

A filtering vessel adapted to accommodate a filter bag for filtering a liquid under pressure. The vessel comprises a top open cylindrical housing having a sidewall and a bottom with an outlet port, and a basket supported within the housing to retain the filter bag therein. A jacket is formed to surround a top portion of the housing to form therebetween an annular fluid passage which is open at its upper end and communicates with an inlet port formed at the jacket for coupling a pressurized liquid supply line. Also included in the vessel is a top cover detachably mounted on the housing and the jacket to close the top opening of the housing as well as that of the annular fluid passage. The top cover is formed in its lower surface with peripheral openings and a center opening which are intercommunicated within the top cover. The peripheral openings are arranged to come into fluid communication with the annular passage upon closure of the top cover such that the liquid entering the annular fluid passage is directed through the peripheral openings and through the center opening into the filter bag, whereby the liquid is forced to flow downward substantially uniformly into the filter bag from the center opening remote from the upper periphery of the filter bag and that of the basket to be filtered through the filter bag and discharged through the outlet port.

4 Claims, 2 Drawing Sheets

LIQUID FILTERING VESSEL

BACKGROUND OF THE INVENTION

1. Field of the Invention

The present invention is directed to a liquid filtering vessel, and more particularly to a vessel for filtering liquids fed under pressure through a filter bag held within the vessel.

2. Description of the Prior Art

Liquid filtering vessels have been employed in industry for filtering various kinds of liquids through a filter bag retained in the vessels. Typical prior art vessels for use in carrying out the filtering operations by means of the filter bags are disclosed in the following U.S. Letters Patents.

1) U.S. Pat. No. 3,640,392 patented on Feb. 8, 1972 to Smith et al;
2) U.S. Pat. No. 3,814,261 patented on Jun. 4, 1974 to Morgan, Jr.; and
3) U.S. Pat. No 4,283,281 patented on Aug. 11, 1981 to Cogan.

U.S. Pat. No. 3,640,392 provides a filtering vessel comprising a top-open housing retaining therein a filter bag and a top cover connected to the housing by means of a hinge for swing-open and close the top opening of the housing. The top cover is formed with a center inlet for discharging liquid into the filter bag through the upper opening thereof. The center inlet is coupled to a pressurized liquid supply line through a liquid inlet passage formed in the hinge and through a liquid supply plumbing connection which is permanent and need not open be disturbed when the cover is open. In this patent, the liquid is directed down into the filter bag from the center inlet in the top cover in order to be uniformly fed into the bag and be filtered evenly through substantially the entire area of the bag for effective filtration at the expense of providing the liquid inlet passage in the hinge and a manifold additionally formed on the top cover for fluid communication between the inlet passage and the center inlet. However, because of that the liquid is fed under pressure from the inlet passage to the center inlet through the manifold or single channel in one fixed direction, the liquid will rush through the center inlet into the filter bag as being deviated or oriented toward the one circumferential portion of the bag. Thus, the vessel of this patent is still insufficient to provide a uniform liquid flow down into the filter bag, in addition to requiring a rather heavy structure of the top cover which is disadvantage for repeated replacement of the filter bag.

U.S. Pat. No. 3,814,261 provides a filtering vessel comprising a top-open housing retaining therein a filter bag and a top cover closing the top opening of the housing. The top cover is formed with an upwardly offset marginal portion which, in cooperation with an inlet port in the housing sidewall, defines a passage utilized to direct liquid from the inlet port upwardly and over the upper edge of the filter bag into the bag. In this patent, the liquid flow is limited to the one circumferential portion of the filter bag directly below the upwardly offset marginal portion of the top cover, resulting in a localized flow and therefore failing to supply the liquid uniformly into the filter bag which may leads in most cases to poor filtering efficiency.

U.S. Pat. No. 4,283,281 is directed to a like filtering vessel with a top cover fitted over the upper open end of a housing retaining a filter bag. A collar is provided around a housing sidewall to define a liquid flow path around the upper end portion of the housing below the top cover. The liquid flow path extends from an inlet port in the collar to substantially entire perimetric entrance to the housing upper end below the top cover, for directing the liquid from the inlet port, around the sidewall and over the upper end below the top cover, and into the filter bag over substantially the entire perimetric entrance thereof. This patent teaches to eliminate any liquid path in the top cover and instead to provide the circumferential liquid path around the upper end of the housing for directing the liquid into the filter bag over the perimeter of the housing.

SUMMARY OF THE INVENTION

The present invention is contemplated to direct the liquid flow down centrally into a filter bag from a center opening in a top cover of a vessel housing without requiring any plumbing coupling means on the side of the top cover. The improved filtering vessel in accordance with the present invention comprises the housing of cylindrical configuration having a sidewall and a bottom with an outlet port, and the top cover closing a top opening of the housing. The housing receives a basket for retaining the filter bag with its mouth open upward in the housing. A jacket is included to surround the upper portion of the housing sidewall to form therebetween an annular fluid passage which is open upward and communicates with an inlet port formed in the jacket for plumbing connection with a pressurized liquid supply line. The top cover is detachably mounted on top of the housing and the jacket to seal the top opening of the housing as well as that of the annular fluid passage. The top cover is formed in its lower surface with peripheral openings and a center opening which are intercommunicated within the top cover. The peripheral openings are arranged to come into fluid communication with the top open end of the annular fluid passage upon closure of the top cover on the housing such that the liquid entering the annular passage is directed through the peripheral openings and through the center opening into the filter bag. Whereby the liquid is forced to flow downward into the filter bag from the center opening remote from the upper periphery of the filter bag so as to be filtered through the filter bag and discharged through the outlet port out of the vessel.

Accordingly, it is a primary object of the present invention to provide an improved filtering vessel which is capable of directing the liquid flow down into the filter bag from the center opening in the top cover, while permitting the top cover to open and close freely without requiring disconnection of the plumbing connection from the liquid supply line.

In a preferred embodiment of the present invention, the peripheral openings of the top cover comprises a plurality of circumferentially and evenly spaced slots which are intercommunicated with the center opening respectively through radial channels formed in the top cover. With this result, the pressurized liquid will merge at the center opening as being directed through the respective radial channels or from differing directions and is then directed through the center opening down into the filter bag such that the liquid can be substantially uniformly distributed in the filter bag for effective filtration therethrough, which is therefore another object of the present invention.

The top cover is preferably designed to comprise a pair of upper and lower metal plates secured together by suitable means so that the center opening and the slots can be formed in the lower metal plate as penetration holes and that the he same as radial grooves. Thus, the top cover can be readily and easily fabricated without requiring any other additional complicated fluid passage forming parts, which is therefore a further object of the present invention.

Also in the preferred embodiment of the present invention, the top cover is connected to the housing by means of hinge assembly to swing between a closed position and an open position. In the close position, the top cover is secured to the housing by means of clamps which comprises plural sets of fasteners spaced evenly around the housing and provided in the same number as the slots. Each of the fasteners comprises a swivel pin carried on the housing, a swing bolt having one end journaled to the swivel pin and having the other end adapted to extend through one of notches formed in the periphery of the top cover in evenly circumferentially spaced relation, and a lock nut engaging the other end of the swing bolt above the notch to clamp the top cover on the housing. The hinge assembly comprises hinge arms secured to the periphery of the top cover and depending from a portion adjacent to one of the plural notches. The hinge arms are adapted to be journaled at the lower ends to the swivel pin in any one of the fasteners, whereby the top cover can be hinged at any one of the fasteners while it is clamped to the housing by the remaining fasteners.

It is therefore a still further object of the present invention to provide an improved filtering vessel which is capable of switching the hinge connection between the top cover and the housing so that the top cover can be swing in an optimum direction depending upon the requirement at a particular installation site.

These and still other object and advantageous features of the present invention will become more apparent in the following description of the preferred embodiment of the present invention when taken in conjunction with the attached drawings.

DETAILED DESCRIPTION OF THE PREFERRED EMBODIMENT

Figure 1:
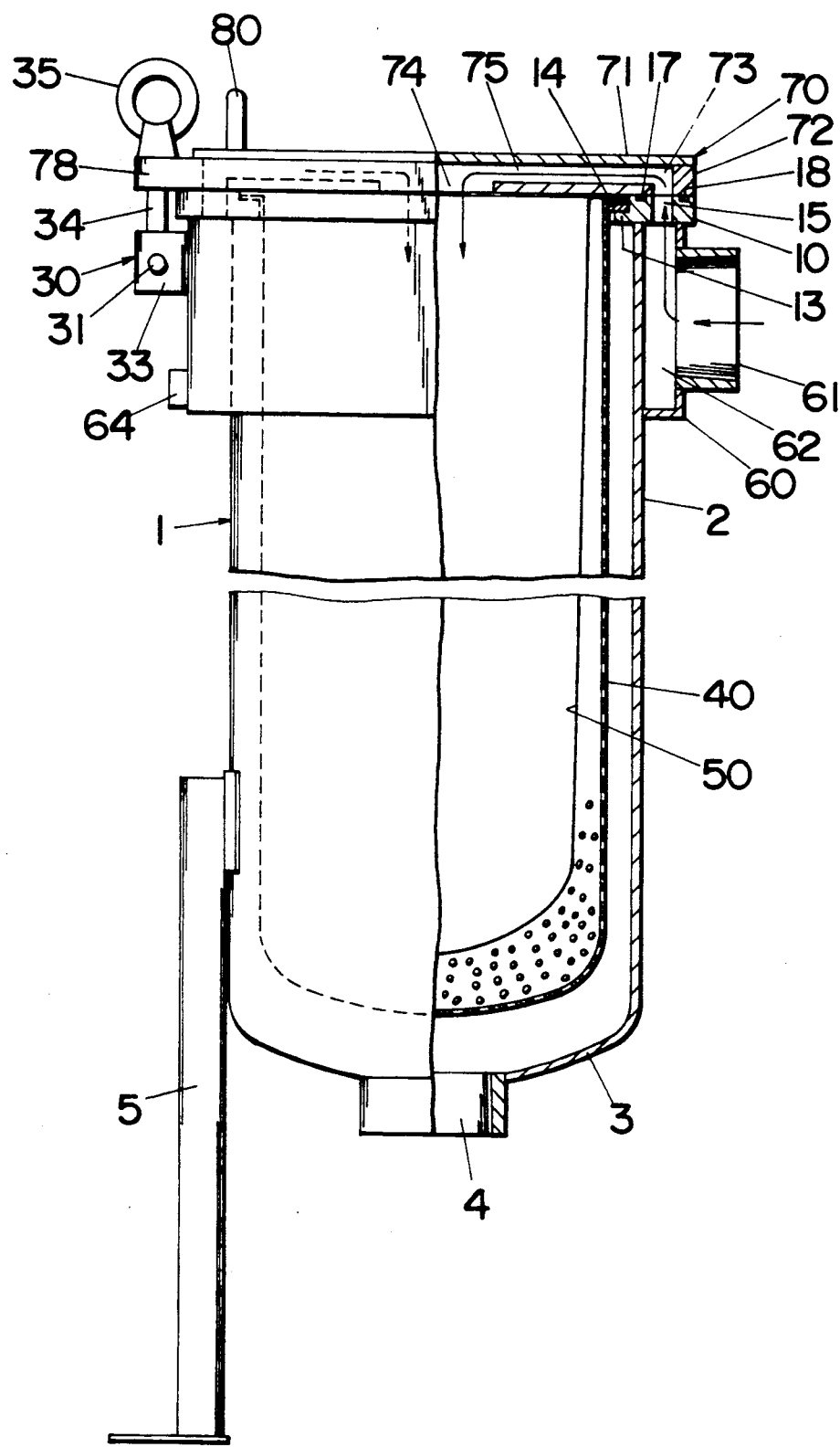
FIG. 1 is a front view, partly in section, of a filtering vessel in accordance with a preferred embodiment of the present invention.

Referring now to FIG. 1, a filtering vessel in accordance with a preferred embodiment of the present invention is shown to comprise a top open cylindrical housing 1 and a top cover 70 connected thereto by means of a hinge 20 for swing-open and close the top of the housing 1. The housing 1 has a sidewall 2 with a flange 10 at its upper end and a bottom 3 with an outlet port 4, and is supported in an upstanding position by means of legs 5 (only one of which is seen in FIG. 1). The flange 10 extends the entire periphery of the housing top opening for supporting the top cover 70 in sealing contact therewith and comprises an outer flange and an inner flange projecting outwardly and inwardly of the housing 1, respectively. Removably received within the housing 1 is a reticulated basket 40 made of perforated metal sheet or the like for retaining therein a filter bag 50 fabricated of porous material. The basket 40 is suspended in the housing 1 with its upper rim seated against an shoulder 13 in the inner part of the flange 10. A ring member at the upper end of the filter bag 50 is nested on the upper rim of the basket 40 and is pressed thereagainst by the top cover 70 in the closed position to thereby firmly hold the filter bag 50 and the basket 40 together between the top cover 70 and the flange 10 Of the housing 1. A seal ring 14 is provided on the shoulder 15 to provide an effective seal.

A jacket 60 is provided around the top portion of the housing sidewall 11 to define therebetween an annular fluid passage 62 in fluid communication with an inlet port 61 which is formed in the jacket 60 and projects outwardly for plumbing connection to a pressurized liquid supply line (not shown). The upper end of the annular fluid passage 62 is closed by the flange 10 except for a plurality of vents 15 formed in the flange 10 and evenly spaced circumferentially.

Figure 2:
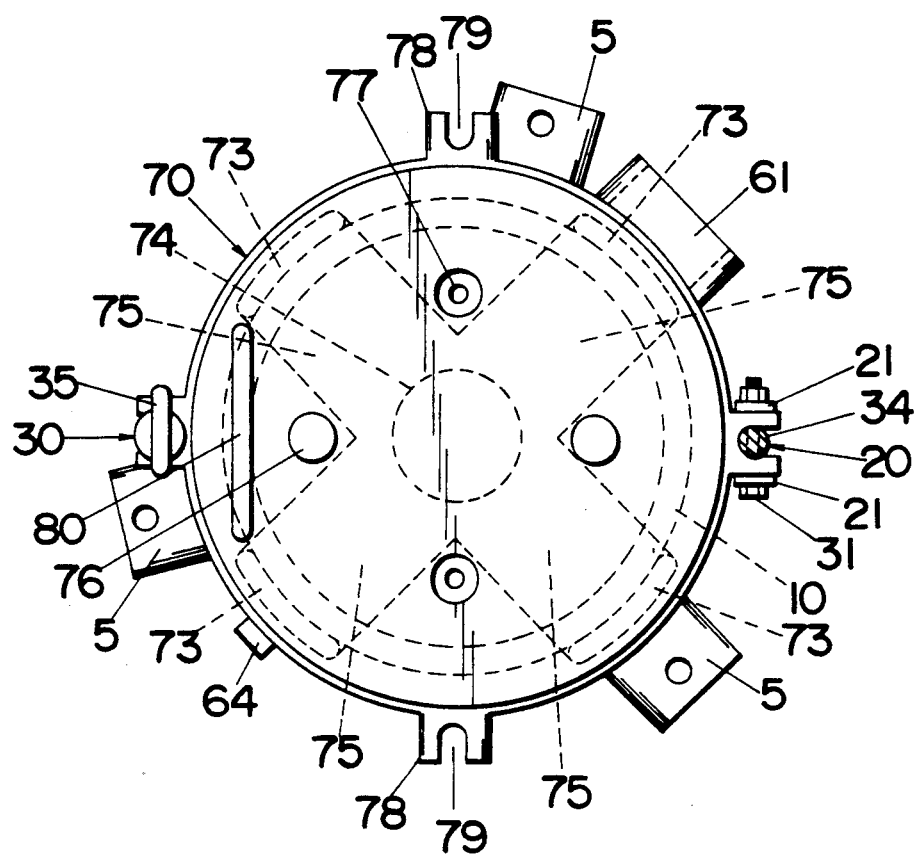
FIG. 2 is a top view of the vessel.

The top cover 70 is formed in the its lower surface with a plurality of peripheral slots 73 which, as indicated by dotted lines in FIG. 2, are evenly spaced circumferentially and are exactly registered respectively with the vents 15 in the flange 10. Also formed in the lower surface of the top cover 70 is a center opening 74 which communicates with the slots 73 through a corresponding number of radial channels 75 formed within the top cover 70. Whereby, the pressurized liquid from the supply line is firstly directed through the inlet port 61 into the annular fluid passage 62, upward through the vents 15 and slots 73 into the top cover 70, and is then redirected through the individual channels 75 toward the center opening 74 to be discharged down into the filter bag 50 therethrough. It should be noted at this time that the liquid will merge at the center opening 74 as being fed along omni-directions through the individual radial channels 75 prior to being discharged through the center opening 74 so as to produce a downward liquid flow with no particular deviated flow pattern into the filter bag 50, thereby uniformly filling the filter bag for effective filtration through substantially the entire area of the filter bag 50. The liquid after passing the filter bag 50 is discharged out through the outlet port 4 for recovery. A drain plug 64 is provided in the lower portion of the jacket 40 for drainage of the liquid remaining in the annular passage 62. O-rings 17 and 18 are disposed in the flange 10 at positions outwardly and inwardly of the vents 15 for sealing against the under surface of the top cover 70.

For simplifying the structure, top cover 70 is composed of upper and lower flat metal plates 71 and 72 which are secured together by means of pins 76, the upper mating surface of the lower plate 72 is cut to form the radial channel 75, and the center and the peripheral portions thereof are perforated to form the center opening 74 and the slots 73. Thus, the top cover plate 70 is fabricated in a simple and ease manner without requiring any additional complicated parts or processing to form the fluid path therein. The top cover 70 is additionally formed with a handle 80 and ports 77 for mounting a pressure gauge, leakvalve, or the like.

Integrally projecting outwardly from the top cover 70 are a plurality of tabs 78 with notches 79 which are provided in the same number as the slots 73 and are evenly spaced around the periphery of the top cover 70.

Figure 3:
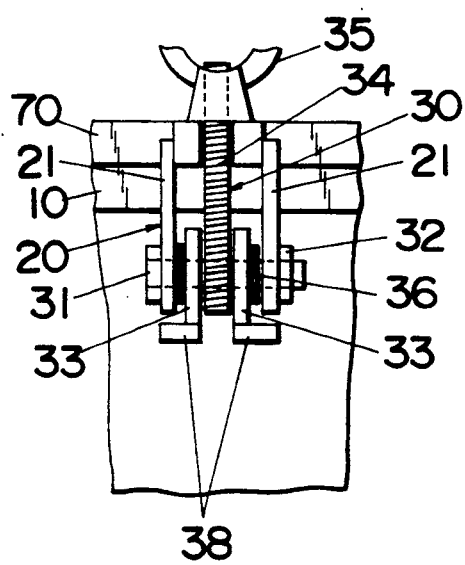
FIG. 3 is a partial side view of a hinge connection between a top cover and a housing composing the vessel.
Figure 4:
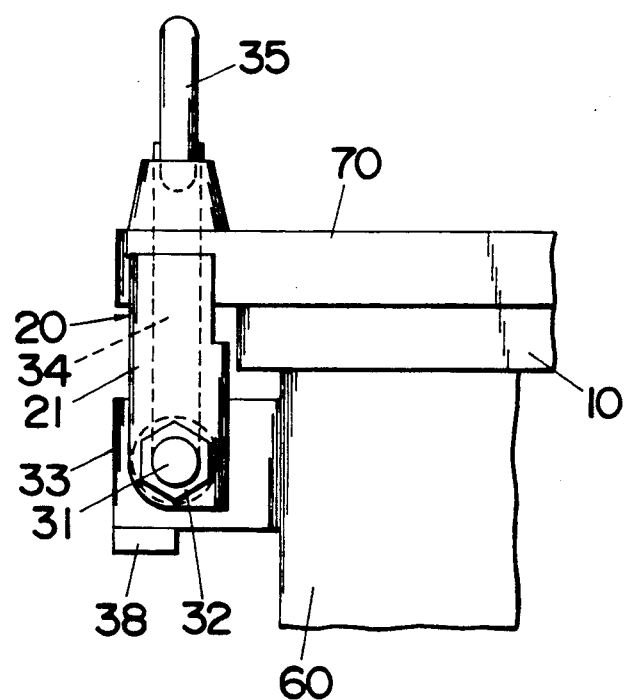
FIG. 4 is a partial front view of the hinge connection.

As shown in FIGS. 3 and 4, only one of the tabs 78 includes a pair of hinge arms 21 which depend from the opposite sides of the notch 79 and defines the hinge 2 with one of clamp fasteners 30 formed around the jacket 60. The remaining tabs 78 are cooperative with the corresponding fasteners 30 to clamp the top cover 70 on top of the housing 1. The fastener 30, which are provided in the same number and circumferentially spaced evenly as the tabs 78, are of the identical structure comprising a swivel pin 31 extending through opposed yokes 33 fixed on the jacket 60 and a swing bolt 34 journaled at its lower end for pivot movement about an horizontal axis of the swivel pin 31. The upper end of the swing bolt 34 of each clamp 30 extends through the notch 79 of the corresponding tab 78 for engagement with an eye bolt nut 35. The hinge connection of the top cover 70 is made, as shown in FIGS. 3 and 4, simply by attaching the hinge arms 21 to the swivel pin 31 so that the hinge arms 21 and the swing bolts 34 swing together about the axis of the pin 31 for opening and closing the top cover 70. As shown in the figures, the swing pin 31 is in the form of a bolt with an head and a nut 32 to be easily disconnected from the hinge arms 21. Collar rings 36 are fitted On the swivel pin 31 on both sides of the yokes 33. Stops 38 are formed adjacent the yokes 33 for abutment against the hinge arms 21 so as to limit the opening angle of the top cover 70.

As apparent from the above description, the hinge connection can be made at any one of the fasteners 30 simply by connecting the hinge arms 21 to the swivel pin of the selected one of the fasteners 30 for adjusting the opening direction of the top cover 70 in compliance with a space or other requirement at a particular installation site, while the remaining fasteners 30 are utilized to clamp the top cover 70 on top of the housing 1. It is noted at this time that, since the fasteners 30 are spaced circumferentially evenly and provided in the same number as the slots 74 and the vents 15, the slots 74 of the top cover 70 can come into exact registration with the vents 15 of the flange 10 for constant fluid intercommunication therebetween irrespective of the hinge connecting positions of top cover 70.

What is claimed is:

1. A filtering vessel adapted to accommodate a filter bag for filtering a liquid under pressure, said filtering vessel comprising:
   a top opening housing having a sidewall and a bottom with and outlet port;
   a basket supported within said housing to retain therein said filter bag;
   a jacket surrounding a top portion of said housing sidewall to form therebetween an annular fluid passage open upward, said jacket including an inlet port in fluid communication with said annular fluid passage and adapted to be coupled to a pressurized liquid supply line;
   a top cover detachably mounted on top of said housing and said jacket to close the top opening of said housing, said top cover provided in its lower surface with peripheral opening means and a center opening which are intercommunicated within said top cover, said peripheral opening means being arranged to come into fluid communication with said annular passage upon closure of said top cover such that the liquid entering said annular passage is directed through said peripheral opening means and through said center opening into said filter bag, whereby the liquid is forced to flow downwardly substantially uniformly into said filter bag from said center opening remote from the upper periphery of said filter bag and that of said basket to be filtered through said filter bag and discharged through said outlet port;
   wherein said peripheral opening means comprises a plurality of circumferentially and evenly spaced slots which are intercommunicated with said center opening respectively through radial channels formed within said top cover, and said annular passage is open upward at a plurality of circumferentially and evenly spaced vents which are in registry with the corresponding ones of said slots when the top cover is closed on top of the housing.

2. A filtering vessel as set forth in claim 1, wherein said top cover comprises a pair of upper and lower flat metal plates secured together, said lower metal plate is formed with said center opening and slots both penetrating therethrough, said radial channels formed in the upper mating surface of said lower metal plate for intercommunication between said center opening to said individual slots.

3. A filtering vessel adapted to accommodate a filter bag for filtering a liquid under pressure, said filtering vessel comprising:
   a top opening housing having a sidewall and a bottom with an outlet port;
   a basket supported within said housing to retain therein said filter bag;
   a jacket surrounding a top portion of said housing sidewall to form therebetween an annular fluid passage open upward, said jacket including an inlet port in fluid communication with said annular fluid passage and adapted to be coupled to a pressurized liquid supply line;
   a top cover detachably mounted on top of said housing and said jacket to close the top opening of said housing, said top cover provided in its lower surface with peripheral opening means and a center opening which are intercommunicated within said top cover, said peripheral opening means being arranged to come into fluid communication with said annular passage upon closure of said top cover such that the liquid entering said annular passage is directed through said peripheral opening means and through said center opening into said filter bag, whereby the liquid is forced to flow downwardly substantially uniformly into said filter bag from said center opening remote from the upper periphery of said filter bag and that of said basket to be filtered through said filter bag and discharged through said outlet port;
   wherein said peripheral opening means comprises a plurality of circumferentially spaced slots which are intercommunicated with said center opening respectively through radial channels formed within said top cover; and
   wherein said top cover comprises a pair of upper and lower flat metal plates secured together, said lower metal plate is formed with said center opening and slots both penetrating therethrough, said radial channels formed in the upper mating surface of said lower metal plate form intercommunication between said center opening to said individual slots.

4. A filtering vessel adapted to accommodate a filter bag for filtering a liquid under pressure, said filtering vessel comprising:

a top open housing having a sidewall with an inlet port and a bottom with an outlet port;

a basket supported within said housing to retain therein said filter bag through which the liquid entering said inlet port is filtered and discharged out through said outlet port;

a top cover fitted on said housing for close a top opening of said housing;

hinge means connecting said top cover to said housing to swing said top cover between a closed position and an open position; clamp means for securing said top cover on the top end of said housing when said top cover is closed, said clamp means comprises plural sets of fasteners spaced around the periphery of said housing, each of said fasteners comprising a swivel pin carried on said housing, a swing bolt having one end journaled to said swivel pin and having the other end extending through one of notches formed in the periphery of said top cover in circumferentially spaced relation, and a lock nut engaging the other end of said swing bolt above said notch, said hinge means comprising hinge arm means secured to the periphery of said top cover and depending from a portion thereof adjacent to one of said notches, said hinge arm means being adapted to be journaled at its lower end to said swivel pin in any one of said fasteners, whereby said top cover can be hinged at any one of said fasteners while it is secured to said housing at the remaining fasteners.

* * * * *